US010474653B2

(12) United States Patent
Mukherjee et al.

(10) Patent No.: US 10,474,653 B2
(45) Date of Patent: Nov. 12, 2019

(54) FLEXIBLE IN-MEMORY COLUMN STORE PLACEMENT

(71) Applicant: Oracle International Corporation, Redwood Shores, CA (US)

(72) Inventors: Niloy Mukherjee, Belmont, CA (US); Jesse Kamp, Castro Valley, CA (US); Tirthankar Lahiri, Palo Alto, CA (US); Maria Colgan, Menlo Park, CA (US); Vivekanandhan Raja, Fremont, CA (US); Vasudha Krishnaswamy, Fremont, CA (US); Aditi Gupta, Sunnyvale, CA (US); Kartik Kulkarni, Foster City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 504 days.

(21) Appl. No.: 15/281,718

(22) Filed: Sep. 30, 2016

(65) Prior Publication Data

US 2018/0096010 A1    Apr. 5, 2018

(51) Int. Cl.
*G06F 16/22* (2019.01)
*G06F 3/06* (2006.01)
(Continued)

(52) U.S. Cl.
CPC ............ *G06F 16/221* (2019.01); *G06F 3/064* (2013.01); *G06F 3/0604* (2013.01); *G06F 3/067* (2013.01);
(Continued)

(58) Field of Classification Search
CPC ............... G06F 16/221; G06F 16/2282; G06F 16/24552
See application file for complete search history.

(56) References Cited

U.S. PATENT DOCUMENTS 2,883,255 A     4/1959  Anderson
5,548,539 A     8/1996  Vlach et al.
(Continued)

FOREIGN PATENT DOCUMENTS

EP     0 750 256 A2    6/1996
EP     0 0942 363 A2   9/1999
(Continued)

OTHER PUBLICATIONS

Oracle® Automatic Storage Management, "Administrator's Guide", 12c Release 1 (12.1), dated May 2015, 620 pages.
(Continued)

*Primary Examiner* — Cam Y T Truong
(74) *Attorney, Agent, or Firm* — Hickman Palermo Becker Bingham LLP

(57) ABSTRACT

Techniques are described herein for distributing distinct portions of a database object across volatile memories of selected nodes of a plurality of nodes in a clustered database system. The techniques involve storing a unit-to-service mapping that associates a unit (a database object or portion thereof) to one or more database services. The one or more database services are mapped to one or more nodes. The nodes to which a service is mapped may include nodes in disjoint database systems, so long as those database systems have access to a replica of the unit. The database object is treated as in-memory enabled by nodes that are associated with the service, and are treated as not in-memory enabled by nodes that are not associated with the service.

26 Claims, 9 Drawing Sheets

(51) Int. Cl.
*G06F 16/27* (2019.01)
*G06F 16/2455* (2019.01)

(52) U.S. Cl.
CPC .... *G06F 16/2282* (2019.01); *G06F 16/24552* (2019.01); *G06F 16/27* (2019.01)

(56) References Cited

U.S. PATENT DOCUMENTS

| | | | |
|---|---|---|---|
| 5,566,316 A | 10/1996 | Fechner et al. |
| 5,600,791 A | 2/1997 | Carlson et al. |
| 5,721,825 A | 2/1998 | Lawson et al. |
| 5,721,909 A | 2/1998 | Oulid-Aissa et al. |
| 5,890,167 A | 3/1999 | Bridge, Jr. et al. |
| 5,909,570 A | 6/1999 | Webber |
| 5,918,059 A | 6/1999 | Tavallaei et al. |
| 5,933,604 A | 8/1999 | Inakoshi |
| 5,951,694 A | 9/1999 | Choquier et al. |
| 6,035,379 A | 3/2000 | Raju et al. |
| 6,041,357 A | 3/2000 | Kunzelman et al. |
| 6,061,678 A | 5/2000 | Klein et al. |
| 6,088,727 A | 7/2000 | Hosokawa et al. |
| 6,088,728 A | 7/2000 | Bellemore et al. |
| 6,105,067 A | 8/2000 | Batra |
| 6,134,549 A | 10/2000 | Regnier et al. |
| 6,178,529 B1 | 1/2001 | Short et al. |
| 6,243,718 B1 | 6/2001 | Klein et al. |
| 6,243,751 B1 | 6/2001 | Chatterjee et al. |
| 6,266,666 B1 | 7/2001 | Ireland et al. |
| 6,272,491 B1 | 8/2001 | Chan et al. |
| 6,272,523 B1 | 8/2001 | Factor |
| 6,282,537 B1 | 8/2001 | Madnick et al. |
| 6,304,967 B1 | 10/2001 | Braddy |
| 6,310,883 B1 | 10/2001 | Mann et al. |
| 6,321,235 B1 | 11/2001 | Bird |
| 6,327,622 B1 | 12/2001 | Jindal et al. |
| 6,353,898 B1 | 3/2002 | Wipfe et al. |
| 6,415,333 B1 | 7/2002 | Vasell |
| 6,438,705 B1 | 8/2002 | Chao et al. |
| 6,453,314 B1 | 9/2002 | Chan et al. |
| 6,466,949 B2 | 10/2002 | Yang et al. |
| 6,529,906 B1 | 3/2003 | Chan |
| 6,556,659 B1 | 4/2003 | Bowman-Amuah |
| 6,587,866 B1 | 7/2003 | Modi et al. |
| 6,594,786 B1 | 7/2003 | Connelly et al. |
| 6,601,101 B1 | 7/2003 | Lee et al. |
| 6,728,748 B1 | 4/2004 | Mangipudi et al. |
| 6,732,063 B2 | 5/2004 | Famili et al. |
| 6,738,790 B1 | 5/2004 | Klein et al. |
| 6,738,933 B2 | 5/2004 | Fraenkel et al. |
| 6,748,414 B1 | 6/2004 | Bournas |
| 6,801,949 B1 | 10/2004 | Bruck et al. |
| 6,816,907 B1 | 11/2004 | Mei et al. |
| 6,826,753 B1 | 11/2004 | Dageville et al. |
| 6,880,002 B2 | 4/2005 | Hirschfeld et al. |
| 6,925,477 B1 | 8/2005 | Champagne et al. |
| 6,950,848 B1 | 9/2005 | Yousefizadeh |
| 6,978,366 B1 | 12/2005 | Ignatchenko et al. |
| 6,990,606 B2 | 1/2006 | Schroiff et al. |
| 7,032,025 B2 | 4/2006 | Boys |
| 7,039,654 B1 | 5/2006 | Eder |
| 7,039,669 B1 | 5/2006 | Wong et al. |
| 7,058,717 B2 | 6/2006 | Chao et al. |
| 7,058,957 B1 | 6/2006 | Nguyen |
| 7,080,075 B1 | 7/2006 | Chan et al. |
| 7,093,250 B1 | 8/2006 | Rector |
| 7,136,825 B2 | 11/2006 | Araki et al. |
| 7,174,379 B2 | 2/2007 | Agarwal et al. |
| 7,177,823 B2 | 2/2007 | Lam et al. |
| 7,178,050 B2 | 2/2007 | Fung et al. |
| 7,225,240 B1 | 5/2007 | Fox et al. |
| 7,263,590 B1 | 8/2007 | Todd et al. |
| 7,269,157 B2 | 9/2007 | Klinker et al. |
| 7,272,653 B2 | 9/2007 | Levy-Abegnoli et al. |
| 7,272,688 B1 | 9/2007 | Glasco |
| 7,292,961 B2 | 11/2007 | Dias et al. |
| 7,293,255 B2 | 11/2007 | Kumar |
| 7,296,268 B2 | 11/2007 | Darling et al. |
| 7,299,294 B1 | 11/2007 | Bruck et al. |
| 7,346,744 B1 | 3/2008 | Glasco |
| 7,349,980 B1 | 3/2008 | Darugar et al. |
| 7,370,223 B2 | 5/2008 | Olmstead et al. |
| 7,379,952 B2 | 5/2008 | Chan et al. |
| 7,386,849 B2 | 6/2008 | Dageville et al. |
| 7,389,293 B2 | 6/2008 | Chan et al. |
| 7,392,421 B1 | 6/2008 | Bloomstein et al. |
| 7,447,693 B2 | 11/2008 | Wilding et al. |
| 7,493,400 B2 | 2/2009 | Loaiza et al. |
| 7,500,001 B2 | 3/2009 | Tameshige et al. |
| 7,506,034 B2 | 3/2009 | Coates et al. |
| 7,512,686 B2 | 3/2009 | Berg |
| 7,702,676 B2 | 4/2010 | Brown et al. |
| 7,805,407 B1 | 9/2010 | Verbeke et al. |
| 7,809,690 B2 | 10/2010 | Pommerenk et al. |
| 7,814,065 B2 | 10/2010 | Chan et al. |
| 7,984,073 B1 | 7/2011 | Basiago |
| 8,065,284 B2 | 11/2011 | Kaplan |
| 8,117,488 B2 | 2/2012 | Chan et al. |
| 8,271,468 B1 | 9/2012 | Peddy et al. |
| 8,527,473 B1 | 9/2013 | Brown et al. |
| 8,540,556 B2 | 9/2013 | Hiddink et al. |
| 2001/0023476 A1 | 9/2001 | Rosenzweig |
| 2001/0027406 A1 | 10/2001 | Araki et al. |
| 2001/0027491 A1 | 10/2001 | Terretta et al. |
| 2001/0056493 A1 | 12/2001 | Mineo |
| 2002/0055982 A1 | 5/2002 | Goddard |
| 2002/0073019 A1 | 6/2002 | Deaton |
| 2002/0073139 A1 | 6/2002 | Hawkins et al. |
| 2002/0073354 A1 | 6/2002 | Schroiff et al. |
| 2002/0078263 A1 | 6/2002 | Darling et al. |
| 2002/0087798 A1 | 7/2002 | Perincherry et al. |
| 2002/0099598 A1 | 7/2002 | Eicher et al. |
| 2002/0116457 A1 | 8/2002 | Eshleman et al. |
| 2002/0129146 A1 | 9/2002 | Aronoff et al. |
| 2002/0129157 A1 | 9/2002 | Varsano |
| 2002/0161896 A1 | 10/2002 | Wen et al. |
| 2002/0178276 A1 | 11/2002 | McCartney et al. |
| 2002/0194015 A1 | 12/2002 | Gordon et al. |
| 2002/0198883 A1 | 12/2002 | Nishizawa et al. |
| 2002/0198984 A1 | 12/2002 | Goldstein et al. |
| 2002/0198985 A1 | 12/2002 | Fraenkel et al. |
| 2003/0005028 A1 | 1/2003 | Dritschler et al. |
| 2003/0007497 A1 | 1/2003 | March et al. |
| 2003/0014523 A1 | 1/2003 | Teloh et al. |
| 2003/0037146 A1 | 2/2003 | O'Neill |
| 2003/0039212 A1 | 2/2003 | Lloyd et al. |
| 2003/0046298 A1 | 3/2003 | Weedon |
| 2003/0065986 A1 | 4/2003 | Fraenkel et al. |
| 2003/0074475 A1 | 4/2003 | Ollikainen |
| 2003/0081748 A1 | 5/2003 | Lipinski |
| 2003/0088425 A1 | 5/2003 | Lam et al. |
| 2003/0088671 A1 | 5/2003 | Klinker et al. |
| 2003/0108052 A1 | 6/2003 | Inoue et al. |
| 2003/0126240 A1 | 7/2003 | Vosseler |
| 2003/0135609 A1 | 7/2003 | Carlson et al. |
| 2003/0135642 A1 | 7/2003 | Benedetto et al. |
| 2003/0149550 A1 | 8/2003 | Famili et al. |
| 2003/0154398 A1 | 8/2003 | Eaton et al. |
| 2003/0158951 A1 | 8/2003 | Primak et al. |
| 2003/0167456 A1 | 9/2003 | Sabharwal |
| 2003/0172145 A1 | 9/2003 | Nguyen |
| 2003/0204505 A1 | 10/2003 | Cotner et al. |
| 2003/0208523 A1 | 11/2003 | Gopalan et al. |
| 2003/0229695 A1 | 12/2003 | McBride |
| 2004/0024881 A1 | 2/2004 | Elving et al. |
| 2004/0024979 A1 | 2/2004 | Kaminsky et al. |
| 2004/0030801 A1 | 2/2004 | Moran et al. |
| 2004/0064466 A1 | 4/2004 | Manikutty et al. |
| 2004/0064548 A1 | 4/2004 | Adams et al. |
| 2004/0078455 A1 | 4/2004 | Eide et al. |
| 2004/0078602 A1 | 4/2004 | Rothbarth et al. |
| 2004/0092260 A1 | 5/2004 | Thubert et al. |
| 2004/0098490 A1 | 5/2004 | Dinker et al. |
| 2004/0103195 A1 | 5/2004 | Chalasani et al. |
| 2004/0111506 A1 | 6/2004 | Kundu et al. |

(56) References Cited

U.S. PATENT DOCUMENTS

| | | |
|---|---|---|
| 2004/0117375 A1 | 6/2004 | Saha et al. |
| 2004/0117794 A1 | 6/2004 | Kundu |
| 2004/0153708 A1 | 8/2004 | Joshi et al. |
| 2004/0176996 A1 | 9/2004 | Powers et al. |
| 2004/0205101 A1 | 10/2004 | Radhakrishnan |
| 2004/0205310 A1 | 10/2004 | Yamagami |
| 2004/0243647 A1 | 12/2004 | Oheda |
| 2004/0249788 A1 | 12/2004 | Dant |
| 2004/0257985 A1 | 12/2004 | Sahai et al. |
| 2004/0267760 A1 | 12/2004 | Brundage et al. |
| 2004/0268357 A1 | 12/2004 | Joy et al. |
| 2005/0217711 A1 | 1/2005 | Kaehen et al. |
| 2005/0027796 A1* | 2/2005 | San Andres .......... G06F 11/201 709/203 |
| 2005/0038800 A1 | 2/2005 | Chidambaran et al. |
| 2005/0038833 A1 | 2/2005 | Colrain et al. |
| 2005/0050116 A1 | 3/2005 | Gross et al. |
| 2005/0055383 A1 | 3/2005 | Dias et al. |
| 2005/0086242 A1 | 4/2005 | Ngai et al. |
| 2005/0086263 A1 | 4/2005 | Ngai et al. |
| 2005/0091215 A1* | 4/2005 | Chandra ............. G06F 16/1824 |
| 2005/0097187 A1 | 5/2005 | Thompson et al. |
| 2005/0114309 A1 | 5/2005 | Dettinger et al. |
| 2005/0132222 A1 | 6/2005 | Petrovic |
| 2005/0165925 A1 | 7/2005 | Dan et al. |
| 2005/0188091 A1 | 8/2005 | Szabo et al. |
| 2005/0228822 A1 | 10/2005 | Wason |
| 2005/0239476 A1 | 10/2005 | Betrabet et al. |
| 2005/0267965 A1 | 12/2005 | Heller |
| 2006/0031243 A1 | 2/2006 | Boyle et al. |
| 2006/0036617 A1 | 2/2006 | Bastawala et al. |
| 2006/0036989 A1 | 2/2006 | Chaudhuri et al. |
| 2006/0064478 A1 | 3/2006 | Sirkin |
| 2006/0143178 A1 | 6/2006 | Chan et al. |
| 2006/0161816 A1 | 7/2006 | Gula et al. |
| 2006/0195525 A1 | 8/2006 | Page et al. |
| 2006/0242356 A1 | 10/2006 | Mogi et al. |
| 2006/0265420 A1 | 11/2006 | Macnaughton et al. |
| 2007/0005786 A1 | 1/2007 | Kumar et al. |
| 2007/0022100 A1 | 1/2007 | Kitsuregawa et al. |
| 2007/0226323 A1 | 9/2007 | Halpern |
| 2007/0245088 A1 | 10/2007 | Mogi et al. |
| 2008/0027769 A1 | 1/2008 | Eder |
| 2008/0162583 A1 | 7/2008 | Brown et al. |
| 2008/0222101 A1 | 9/2008 | Beyer et al. |
| 2009/0034537 A1 | 2/2009 | Colrain et al. |
| 2009/0144338 A1 | 6/2009 | Feng et al. |
| 2009/0182718 A1 | 7/2009 | Waclawik et al. |
| 2009/0198736 A1 | 8/2009 | Shen et al. |
| 2009/0216438 A1 | 8/2009 | Shafer |
| 2010/0174863 A1 | 7/2010 | Cooper et al. |
| 2011/0276579 A1 | 11/2011 | Colrain et al. |
| 2012/0166483 A1 | 6/2012 | Choudhary et al. |
| 2012/0173774 A1 | 7/2012 | Lee et al. |
| 2014/0101100 A1 | 4/2014 | Hu et al. |
| 2016/0019253 A1 | 1/2016 | Chan et al. |
| 2016/0070726 A1* | 3/2016 | Macnicol ............. G06F 16/245 707/691 |
| 2016/0117357 A1 | 4/2016 | Colrain et al. |
| 2016/0352665 A1* | 12/2016 | Nielsen ................. G06F 9/4868 |
| 2017/0017680 A1* | 1/2017 | Jaakola ............... G06F 16/2379 |

FOREIGN PATENT DOCUMENTS

| | | |
|---|---|---|
| EP | 0992 909 A2 | 4/2000 |
| EP | 1 170 662 A2 | 1/2002 |
| EP | 1260 902 A2 | 11/2002 |
| GB | 2459354 | 10/2009 |
| JP | 10-187638 | 7/1998 |
| WO | WO 98/44400 | 10/1998 |
| WO | WO 0010084 A | 2/2000 |
| WO | WO 02/05116 A2 | 1/2002 |
| WO | WO 02/07037 | 1/2002 |
| WO | WO 03/014929 A1 | 8/2002 |
| WO | WO 02/097676 A2 | 12/2002 |
| WO | WO 03/014928 A2 | 2/2003 |
| WO | WO 03/048934 A2 | 6/2003 |
| WO | WO 03/062983 A2 | 7/2003 |

OTHER PUBLICATIONS

Neo4j, "Tutorial: Import Data Into Neo4j", https://neo4j.com/developer/guide-importing-data-and-etl/, dated 2016, 9 pages.

Coutinho, B. et al., "Assessing the impact of distribution on e-business services" In First Seminar on Advanced Research in Electronic Business (2002) 8 pages.

"Cisco LocalDirector 400 Series", retrieved on Oct. 14, 2005 from the Internet< URL: http://www.cisco.com/warp/public/cc/pd/cxsr/400/index.shtml > 2 pages.

McDavid, D. "A standard for business architecture description" IBM Systems Journal (1999) 19 pages.

Hunt, G. et al., "Network Dispatcher: a connection router for scalable Internet services" Computer Networks and ISDN Systems (1998) 14 pages.

Henry Song, et al., "Browser State Repository Service," Lecture Notes in Computer Science, vol. 2414, 2002, pp. 1-14, XP002904339.

Harkins, P. "Building a Large-Scale E-commerce site with Apache and mod_perl" In Proceedings of ApacheCom (2001) 15 page document.

Mosberger, D. et al, "httperf—A Tool for Measuring Web Server Performance" In First Workshop on Internet Service Performance (1998) 9 pages.

Eric Skow, et al., "A Security Architecture for Application Session Handoff," 2002, IEEE International Conference Proceedings, Apr. 28-May 2, 2002, vol. 1 of 5, pp. 2058-2063, XP010589848.

Nahum, E. et al., "Performance Issues in WWW Servers" IEEE (2002) 11 pages.

Chase, Jeffrey, "Dynamic Virtual Clusters in a Grid Site Manager", dated Jun. 22, 2003, 11 pages.

Cecchet, E. et al., "A Comparison of Software Architectures for E-business Applications" Technical Report (2002) 15 pages.

Cardellini, V. et al., "The State of the Art in Locally Distributed Web-server Systems" ACM Computing Surveys (2001) 55 pages.

Bestavros, A. et al., "Distributed Packet Rewriting" In Proceedings of the International Conference on Network Protocols (1998) 8 pages.

Aversa, L. et al., "Load Balancing a Cluster of Web Servers" Technical Report (1999) 13 pages.

Amza, C. et al., "Bottleneck Characterization of Dynamic Web Site Benchmarks" In Third IBM CAS Conference (2002) 15 pages.

Gadde, S. et al., "Web Caching and Content Distribution: A View From the Interior" Computer Communications (2001) 12 pages.

Oracle® Real Application Clusters "Installation and Configuration Guide" Part No. B10766-08 (2004) 468 pages.

Wrigley, C. "Design Criteria for Electronic Market Servers" Electronic Markets (1997) pp. 12-16.

The Apache Software Foundation retrieved on Oct. 14, 2005 from the Internet < URL: http:www.apache.org > 2 pages.

Teodoro, G. et al., "Load Balancing on Stateful Clustered Web Servers" IEEE (2003) 9 pages.

Sontag, E. et al., "A Notion of Input to Output Stability" (1997) 6 pages.

Ravi Kokku et al., "Half-pipe Anchoring: An Efficient Technique for Multiple Connection Handoff," Proceedings 10th International Conference on Network Protocols, Nov. 12, 2002, 10 pages.

Meira, W. et al., "E-representative: a scalability scheme for e-commerce", In Proceedings of the International Workshop on Advanced Issues of E-Commercce and Web-based Information Systems, 2000, 8pgs.

Patterson, R. H. 'Informed Prefetching and Caching.' Proceedings of the Fifteenth ACM Symposium on Operating Systems Principles Copper Mountain, Colorado, USA: ACM. (1995) pp. 79-95.

Ying-Dar Lin et al., "Direct Web Switch Routing with State Migration, TCP Masquerade, and Cookie Name Rewriting," Globecom 2003, IEEE Global Telecommunications Conference, Dec. 1, 2003, 5 pages.

(56) References Cited

OTHER PUBLICATIONS

Oracle® Real Application Clusters "Deployment and Performance Guide" Part No. B10768-02 (2004) 58 pages.
Oracle® Database "Net Services Reference Guide"—Part No. B10776-01 (2004) 274 pages.
Oracle® Database "Net Services Administrators Guide" Part No. B10775-01 (2004) 434 pages.
Oracle® Database "JDBC Developer's Guide and Reference" Part No. B10979-02 (2004) 432 pages.
Oracle® Database "High Availability Architecture and Best Practices" Part No. B10726-02 (2004) 222 pages.
Oracle® Database "Concepts" Part No. B10743-01 (2003) 732 pages.
Pierre, G. et al., "Differentiated Strategies for Replicating Web Documents" In Proceedings of the 5th International Web Caching and Content Delivery Workshop (2000) 16 pages.
U.S. Appl. No. 12/776,341, filed May 7, 2010, Advisory Action, dated May 6, 2014.
U.S. Appl. No. 10/917,715, filed Aug. 12, 2004, Final Office Action, dated May 29, 2009.
U.S. Appl. No. 10/917,715, filed Aug. 12, 2004, Notice of Allowance, dated Oct. 9, 2009.
U.S. Appl. No. 10/917,715, filed Aug. 12, 2004, Office Action, dated Jan. 5, 2009.
U.S. Appl. No. 10/917,715, filed Aug. 12, 2004, Final Office Action, dated Apr. 14, 2008.
U.S. Appl. No. 10/917,715, filed Aug. 12, 2004, Final Office Action, dated Sep. 3, 2008.
U.S. Appl. No. 11/168,967, filed Jun. 27, 2005, Final Office Action, dated Sep. 10, 2009.
U.S. Appl. No. 11/168,967, filed Jun. 27, 2005, Office Action, dated Apr. 8, 2009.
U.S. Appl. No. 11/937,357, filed Nov. 8, 2007, Final Office Action, dated Sep. 15, 2010.
U.S. Appl. No. 11/937,357, filed Nov. 8, 2007, Notice of Allowance, dated Jan. 17, 2012.
U.S. Appl. No. 11/937,357, filed Nov. 8, 2007, Office Action, dated Mar. 16, 2010.
U.S. Appl. No. 10/917,715, filed Aug. 12, 2004, Advisory Action, dated Nov. 14, 2008.
U.S. Appl. No. 11/937,357, filed Nov. 8, 2007, Office Action, dated Feb. 16, 2011.
U.S. Appl. No. 12/776,341, filed May 7, 2010, Final Office Action, dated Jan. 29, 2014.
U.S. Appl. No. 12/776,341, filed May 7, 2010, Notice of Allowance, dated Jun. 15, 2015.
U.S. Appl. No. 12/776,341, filed May 7, 2010, Notice of Allowance, dated Oct. 5, 2015.
U.S. Appl. No. 12/776,341, filed May 7, 2010, Office Action, dated Jan. 23, 2015.
U.S. Appl. No. 12/776,341, filed May 7, 2010, Office Action, dated Mar. 16, 2012.
U.S. Appl. No. 12/776,341, filed May 7, 2010, Office Action, dated Sep. 27, 2013.
U.S. Appl. No. 12/776,341, filed May 7, 2010, Final Office Action, dated Jul. 17, 2012.
U.S. Appl. No. 12/938,545, filed Nov. 3, 2010, Final Office Action, dated Dec. 22, 2011.
U.S. Appl. No. 12/938,545, filed Nov. 3, 2010, Notice of Allowance, dated May 17, 2012.
U.S. Appl. No. 12/938,545, filed Nov. 3, 2010, Office Action, dated Jul. 20, 2011.
U.S. Appl. No. 12/938,545, filed Nov. 3, 2010, Notice of Allowance, dated Sep. 3, 2013.
U.S. Appl. No. 11/937,357, filed Nov. 8, 2007, Final Office Action, dated Aug. 2, 2011.
Colrain, U.S. Appl. No. 14/989,936, filed Jan. 7, 2016, Final Office Action, dated Aug. 6, 2018.
Choudhary, U.S. Appl. No. 15/252,076, filed Aug. 30, 2016, Final Office Action, dated Jan. 9, 2019.

\* cited by examiner

350 OBJECT-TO-SERVICE MAPPING CREATION STATEMENT

{OBJECT} {INMEMORY}

---

352 OBJECT CLAUSE

CREATE TABLE TableName |
ALTER TABLE TableName |
ALTER TABLE TableName MODIFY PARTITION PartitionName |
CREATE TABLESPACE TablespaceName |
ALTER TABLESPACE TablespaceName

---

354 IN-MEMORY CLAUSE

NO INMEMORY |
INMEMORY {PROPERTY}

---

356 PROPERTY CLAUSE

FOR SERVICE [DEFAULT | ALL | NONE | ServiceName]
PRIORITY [HIGH | MEDIUM | LOW | NONE]

FIG. 3

FLEXIBLE IN-MEMORY COLUMN STORE PLACEMENT

CROSS REFERENCE TO RELATED APPLICATIONS; BENEFIT CLAIM

This application is related to application Ser. No. 11/168,967 filed on Jun. 27, 2005 entitled "Runtime Load Balancing of Work Across a Clustered Computing System using Current Service Performance Levels," by Carol Colrain et al., the entire disclosure of which is hereby incorporated by reference as if fully set forth herein.

This application is related to application Ser. No. 10/917,715 filed on Aug. 12, 2004 entitled "Managing Workload By Service," by Carol Colrain and Daniel Semler, the entire disclosure of which is hereby incorporated by reference as if fully set forth herein.

This application is related to application Ser. No. 11/937,357 filed on Nov. 8, 2007 entitled "Combining Streaming And Navigation For Evaluating XML Queries," by Ning Zhang et al., the entire disclosure of which is hereby incorporated by reference as if fully set forth herein.

This application is related to application Ser. No. 12/776,341 filed on May 7, 2010 entitled "Adaptively Routing Transactions To Servers," by Carol Colrain et al., the entire disclosure of which is hereby incorporated by reference as if fully set forth herein.

This application is related to application Ser. No. 12/938,545 filed on Nov. 3, 2010 entitled "Connection Pool Use Of Runtime Load Balancing Service Performance Advisories," by Carol Colrain et al., the entire disclosure of which is hereby incorporated by reference as if fully set forth herein.

This application is related to application Ser. No. 14/989,936 filed on Jan. 7, 2016 entitled "Adaptively Routing Transactions to Servers," by Carol Colrain et al., the entire disclosure of which is hereby incorporated by reference as if fully set forth herein.

This application is related to application Ser. No. 15/252,076 filed on Aug. 30, 2016 entitled "Method and Systems for Master Establishment using Service-Based Statistics," by Dungara Choudhary et al, the entire disclosure of which is hereby incorporated by reference as if fully set forth herein.

FIELD OF THE INVENTION

The present invention relates to data storage and retrieval techniques, and more specifically to flexible in-memory column store placement across multi-node databases.

BACKGROUND

Database systems typically store database objects (e.g., tables, indexes, etc.) on disk, and load data items from those database objects into volatile memory on an as-needed basis. Once loaded into volatile memory, the data items may remain cached in volatile memory so that subsequent accesses to the same data items will not incur the overhead of accessing a disk. Those data items may be replaced in cache, for example, to make room in volatile memory to store other data items that have been requested.

Rather than load individual data items on a per-item basis, entire database objects, or portions thereof, may be loaded into volatile memory. Various approaches for loading entire database objects, or selected portions thereof, into volatile memory to speed up query processing are described in U.S. patent application Ser. No. 14/377,179, entitled "Mirroring, In Memory, Data From Disk To Improve Query Performance," filed Jul. 21, 2014, referred to herein as the "Mirroring" application, the contents of which are incorporated herein in its entirety.

According to the approaches described in the Mirroring application, copies of data objects, or portions thereof, are cached in volatile memory. The format of the pre-loaded cached copy of the objects may be different than the on-disk format. For example, the in-memory version of an object may be in a column-major format, while the on-disk version may be stored in a row-major format. The in-memory version of the object (or selected portions thereof), is referred to as an In-Memory Compression Unit (IMCU) because the data contained therein is often compressed.

A clustered database system comprises a plurality of nodes. When a database object is to be pre-loaded into volatile memory, a copy of the database object may be loaded into the volatile memory of a single node in the cluster. To gain the benefit of having pre-loaded the object, work related to the object may be shipped to the node that pre-loaded the object (the "host" node). For example, assume that a cluster has five nodes N1, N2, N3, N4 and N5. N1 may be the designated host for a table T1. As the host of table T1, N1 loads a copy of T1 into its volatile memory. If any of nodes N2, N3, N4 or N5 receives a request to access data from T1, the task of accessing that data may be sent to node N1.

Rather than have a single node pre-load an entire database object, the database object may be divided into "chunks," and the chunks may be distributed across the nodes in the cluster. For example, table T1 may be divided into chunks C1, C2, C3, C4 and C5 that are assigned to be hosted by nodes N1, N2, N3, N4 and N5, respectively. In a scenario in which a database object is divided into chunks that are distributed among nodes, each node loads its assigned chunk(s) of the database object into its respective volatile memory in response to a load-triggering event. Work involving any given chunk of T1 can be shipped to the node that has been assigned to host the chunk.

Various approaches for making hosting assignments are described in U.S. patent application Ser. No. 14/565,906, entitled "Distribution Of An Object In Volatile Memory Across A Multi-Node Cluster," filed Dec. 10, 2014, referred to herein as the "Distribution" application, the contents of which are incorporated herein in its entirety. According to the approaches described in the Distribution application, all of the nodes in a cluster are treated as candidates for hosting chunks, to maximize utilization of the cluster's resources. Thus, hosting assignments may be made using a distribution method such as a hash function that hashes chunk identifiers to N buckets, where N is the total number of nodes in the cluster.

While spreading chunk-hosting assignments throughout all nodes in a cluster helps with load balancing and parallelism, a hosting assignment technique that only considers the nodes of a cluster, and treats all nodes in a cluster as equal candidates, is not always ideal. For example, spreading chunk-hosting assignments among nodes in a cluster does not make use of resources that are outside the cluster, such as the resources of disjoint database systems.

A disjoint database system is a database system that is logically outside another database system. For example, if DBMS1 is disjoint from DBMS2, then the database server instances in DMBS1 do not have direct access to the same database as DBMS2, and visa-versa. Conventionally, database systems that are disjoint from the database system that is making hosting assignments are not considered in the hosting assignments. Thus, the resources of DBMS2 would not be used when DBMS1 makes hosting assignments for table T1. The failure to make use of DBMS2's resources in this example may be highly inefficient, because DBMS2 may itself be a clustered database system with a significant amount of resources. If it were possible to host objects in DBMS2, in addition to DBMS1, more database objects could be hosted.

In many situations, involving a disjoint database system in the hosting assignments would not even make sense because the disjoint database system would not have access to the database object that is to be hosted. For example, if DBMS2 does not have access to table T1, it does not make sense to assign a node in DBMS2 to be a host of table T1. However, when the disjoint DBMS is a replica of the database system that is making the hosting assignments, then the disjoint DBMS has access to a replica of the database object in question.

Unfortunately, when the disjoint DBMS is a replica, the hosting assignments are also replicated. That is, the same hosting assignments made in the original database system are made in the replica database system. For example, if table T1 is hosted in DBMS1, then table T1 is also hosted in DBMS2. While this approach does make use of the resources of DBMS2, it does not actually increase the number of objects that can be hosted. Instead, it merely causes DBMS2 to load copies of all the same objects that are already going to be hosted in DBMS1. That is, if both DBMS1 and DBMS2 have 3 Terabytes of volatile memory available for hosting objects, then together the two database systems have 6 Terabytes of volatile memory for hosting objects. However, because the same objects are hosted in both systems, only 3 Terabytes of objects can be hosted.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

In the drawings:

FIG. 3 is a block diagram illustrating example statements for creating an object-to-service mapping, in an embodiment;

DETAILED DESCRIPTION

Figure 1:
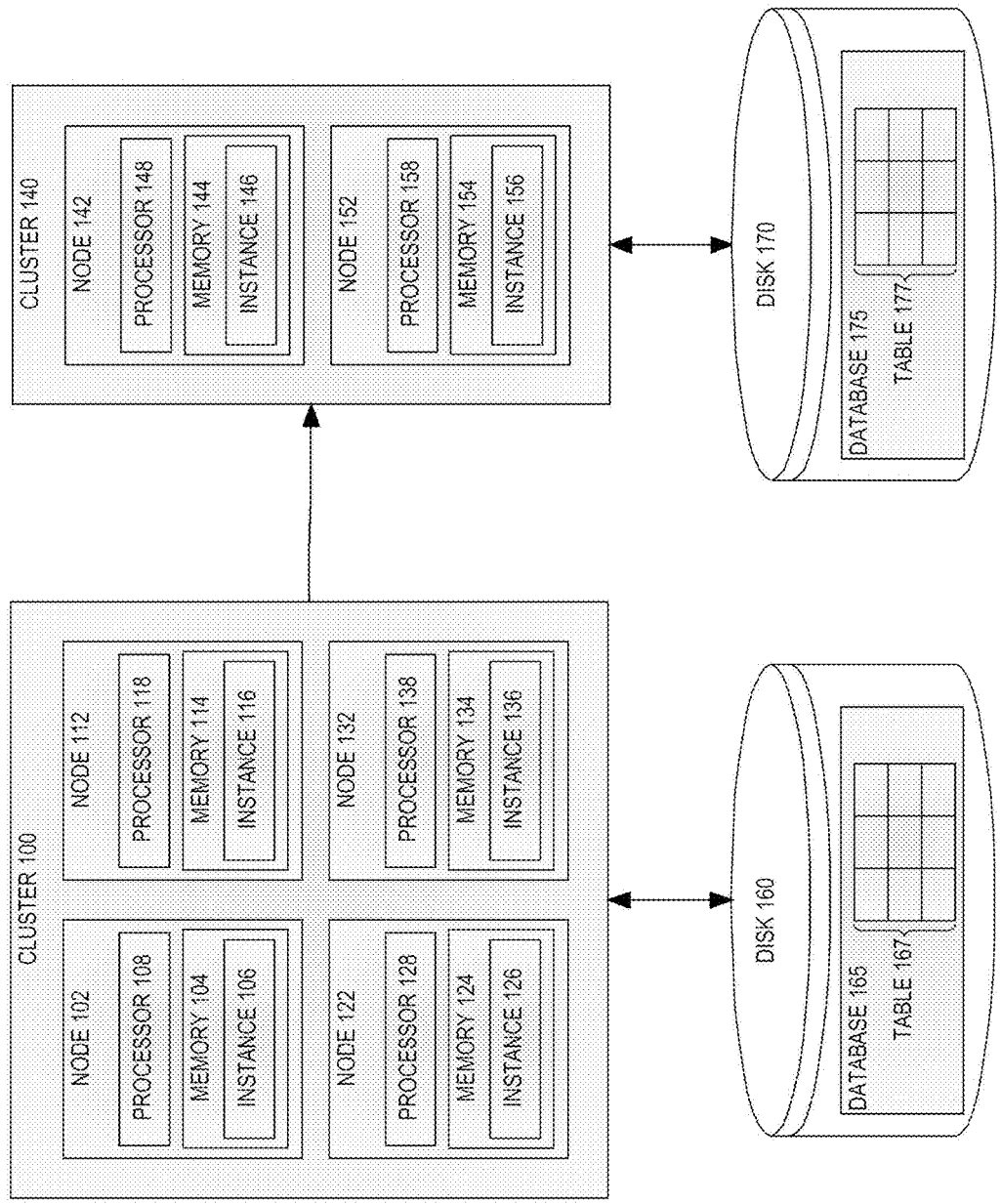
FIG. 1 is a block diagram illustrating a database system in which an embodiment can be implemented.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Techniques are described herein for making hosting assignments. However, unlike prior hosting assignment techniques, users can specify, on an object-by-object basis, which specific nodes will host chunks for any given database object. Further, the hosting assignments may be made across disjoint database systems, so long as all nodes that are being assigned to host an object (or chunks thereof) have access to a copy of the object. Thus, if DBMS1 and DBMS2 have access to different replicas of table T1, then the hosting assignment may assign any nodes in DBMS1 or DBMS2 to host table T1.

Further, the hosting assignments made in replica database systems may be entirely independent of the hosting assignments made in the database systems that they replicate. For example, a node in DBMS1 may be assigned to host a table T1 that is not hosted at all in a replica DBMS2. At the same time, a node in the replica DBMS2 may be assigned to host a table T2 that is not hosted at all in DBMS1. In addition, a table T3 may be divided into three chunks, one of which is hosted by a node in DBMS1 and two of which are hosted by nodes in DBMS2. Thus, even though DBMS2 is a replica of DBMS1, the hosting assignments in DBMS2 do not mirror the hosting assignments in DBMS1. As a result, for the purpose of hosting assignments, the volatile memory of the two disjoint database systems may be treated as a single pool.

Database Services

A database service is a mechanism for grouping work. The grouping is typically based on attributes, such as application functions to be invoked, priority of execution, job class, date range of data, etc. For example, a service X may be created for generating a certain type of report. The service may be assigned two nodes N1 and N2 in a cluster of six nodes. Database clients that need to generate that type of report request service X, which causes the clients to be connected to one of nodes N1 and N2.

Services are a feature for database workload management that divides the types of work executing in the database system. Such division of work allows work to be managed according to service levels. Resources are allocated to a service according to service levels and priority.

Services are a logical abstraction for managing workloads. Services can be used to divide work executing in a database cluster into mutually disjoint classes. Each service can represent a logical business function, e.g., a workload with common attributes, service level thresholds, and/or priorities. The grouping of services is based on attributes of the work that might include the application function to be invoked, the priority of execution for the application function, the job class to be managed, or the data range used in the application function of a job class. For example, an electronic-business suite may define a service for each responsibility, such as general ledger, accounts receivable, order entry, and so on. Services provide a single system image to manage competing applications, and the services allow each workload to be managed in isolation and as a unit.

Since each service serves a particular function, a database service might require only a particular database object, or particular portions of a database object, to accomplish that function. For example, the reports associated with service X may be generated exclusively from data in table T1. Under these circumstances, it would clearly desirable for one or both of nodes N1 and N2 that are providing service X to host table T1. On the other hand, the users of service X would gain no benefit from other tables being hosted on N1 and N2. Therefore, techniques are described hereafter to integrate hosting assignments with database services. By integrating hosting assignments with database services, objects can be hosted on the nodes that are performing the work that is most likely to benefit from having the objects in-memory. Further, the service-to-node assignments may be made across cluster boundaries, thereby allowing the hosting assignments that make use of the collective memory of multiple disjoint database systems.

Integrating Hosting Assignments with Database Services

According to one embodiment, hosting assignments are integrated with database services. Specifically, in one embodiment, an object may be assigned to a service, and one or more nodes assigned to run that service are automatically designated to host of the object. In one embodiment, every node that runs the service hosts the objects that have been assigned to the service. Thus, if nodes N1 and N2 are assigned service X, then nodes N1 and N2 host table T1. In an alternative embodiment, the chunks of an object that is assigned to a service may be distributed among the nodes that are assigned the services. In such an embodiment, node N1 may host some chunks of table T1, while node N2 hosts other chunks of table T1.

The granularity of the hosting assignments may vary. For example, rather than assigning table T1 to service X, chunks C1 and C2 of table T1 may be assigned to service X. In this case, only chunks C1 and C2 would be hosted on nodes N1 and N2. Other chunks of table T1 would not be hosted. Chunk-level assignments may be useful, for example, in situations where a service only uses certain partitions of a larger table. For example, service X may only use partition P1 of table T1, so only partition P1 of table T1 may be assigned to service X.

In one embodiment, the same database object (or chunk thereof) may be assigned to multiple database services. In such an embodiment, the database object (or chunk) is hosted only on the nodes to which any of those database services have been assigned. Thus, if table T1 is assigned to service X and service Y, and service X is assigned to nodes N1 and N2, and service Y is assigned to nodes N2 and N3, table T1 would be hosted on nodes N1, N2 and N3.

As described in greater detail hereinafter, the association of nodes and database objects with services allow users to control the distribution of objects to volatile memory of specific nodes in the database cluster, and across cluster boundaries to nodes in other clusters that have access to replicas of the objects in question.

System Overview

Referring to FIG. 1, it is a block diagram of a system in which an embodiment can be implemented. In the embodiment illustrated by FIG. 1, database cluster 100 comprises four nodes 102, 112, 122, and 132 that have access to the same database 165. For the purpose of illustration, database 165 is stored on a single disk 160, but in alternative embodiments may be spread across multiple disks to which each of nodes 102, 112, 122, and 132 have access.

Nodes 102, 112, 122, and 132 respectively have one or more processors 108, 118, 128, and 138, and local volatile memory 104, 114, 124, and 134. In addition, nodes 102 112, 122, and 132 are respectively executing database server instances 106, 116, 126, and 136. While in the illustrated embodiment each node is executing a single database server instance, in alternative embodiments a single node may execute more than one database server instance.

In the illustrated embodiment, database cluster 100 is communicatively connected to database cluster 140. Cluster 140 comprises two nodes 142 and 152 that have access to a database 175. Clusters 100 and 140 are disjoint relative to each other. For the purpose of describing the techniques herein, it shall be assumed that database 165 and database 175 have replicas of the same objects. For example, database 175 may be a replica database or a backup database of database 165. Nodes 142 and 152 do not have access to database 165, and nodes 102, 112, 122, and 132 do not have access to database 175. Changes from database 165 are logged and replicated on database 175.

Nodes 142 and 152 respectively have one or more processors 148 and 158, and local volatile memory 144 and 154. In addition, nodes 142 and 152 are respectively executing database server instances 146 and 156. While in the illustrated embodiment each node is executing a single database server instance, in alternative embodiments a single node may execute more than one database server instance.

Databases 165 and 175 include copies of the same table T1. For the purpose of illustration, it shall be assumed that table 167 is the copy of table T1 in database 165, and table 177 is the copy of table T1 in database 175. Each of nodes 102, 112, 122, and 132 is able to access data items from table T1 from table 167 that resides on disk 160. Similarly, nodes 142 and 152 are able to access data items from table T1 from table 177 that resides on disk 170. However, it is faster for any given database server instance to access data items from the chunks, of tables 167 and 177, that are cached in the volatile memory that resides on the node in which the database server instance is executing.

In an embodiment, tables 167 and 177 (or portions thereof) are designated as "in-memory enabled." If tables 167 or 177 are in-memory enabled, then chunks of the tables are pre-loaded into volatile memory to speed up query processing. As discussed above with regard to the Mirroring application, the tables (and other database objects) can be divided into distinct portions that are distributed among nodes of the cluster. In some embodiments, database objects are stored in a persistent format in persistent storage, and maintained in a different format (mirror format) in volatile memory. For example, on-disk data can be stored in row-major format while in-memory data is stored in column-major format. In alternative embodiments, the in-memory representation of a database object may have other formats, including the same format in which the data for the object is represented on disk.

The loading of the database objects into volatile memory may be done pro-actively, or on an as-needed basis. How nodes determine whether to load portions of a particular database object into their respective volatile memory shall be described in greater detail hereafter.

Database Services Example

Figure 2:
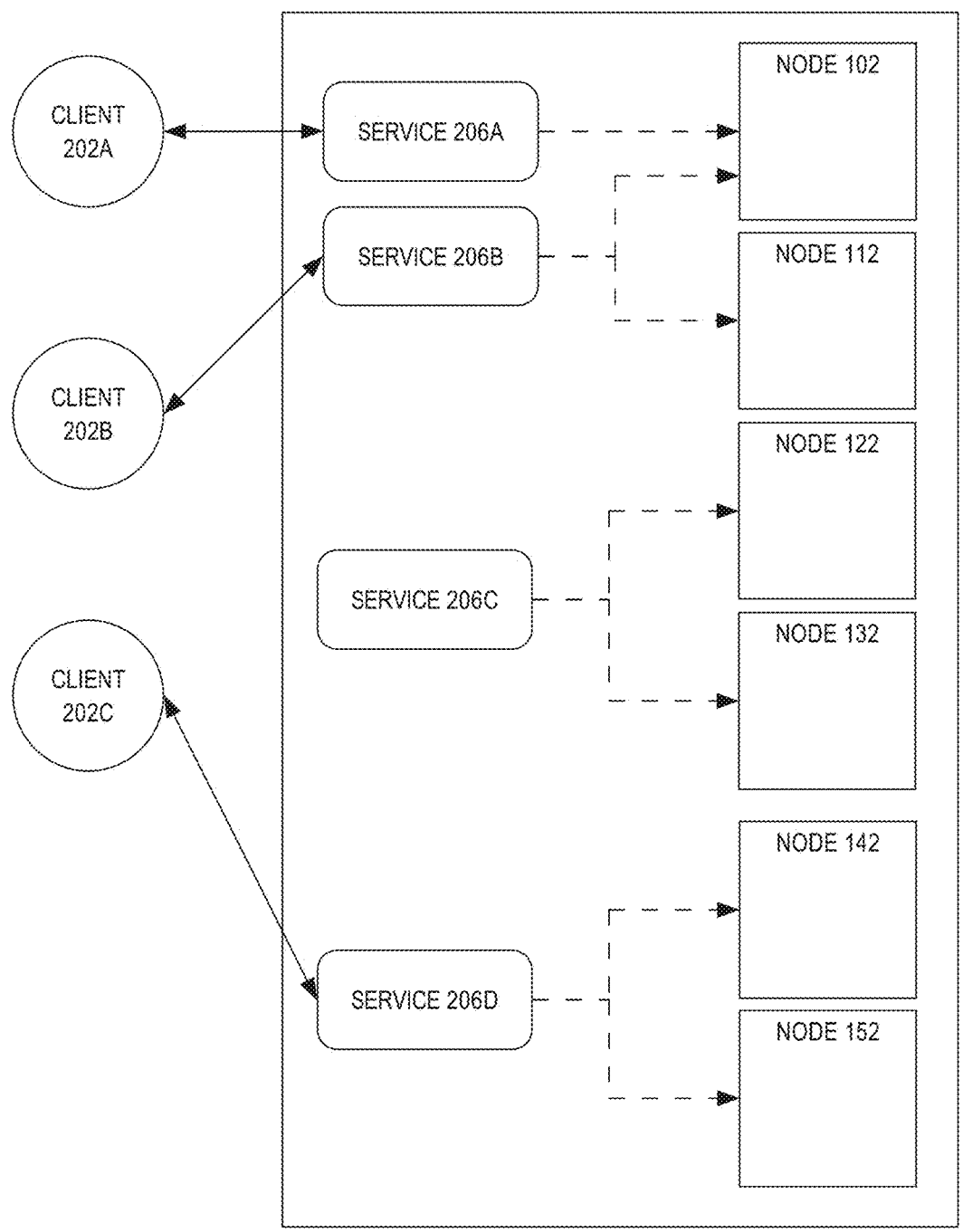
FIG. 2 is a block diagram illustrating clients connected to services running on a database system, in an embodiment.

A service can span multiple server instances in a cluster or multiple clusters in a grid, and a single server instance can support multiple services. Referring to FIG. 2, it is a block diagram illustrating services on database clusters 100 and 140. Service 206A is depicted as being provided by database server instance 106. Service 206B is depicted as being provided by database server instance 106 and 116, service 206C is provided by database server instance 126 and 136, and service 206D is provided by database server instance 146 and 156. In an embodiment, the database system stores a node-to-service mapping that indicates which database server instance or node is providing which database service.

Clients can use a service by specifying the service as part of establishing a connection to a database server. Based on the specified service and the node-to-service mapping, a connection is established from the client to a particular database instance running on a particular node. The client does not need to specify the particular database instance or the particular node. If more than one database server instance is providing a service, a broker process may select a database server instance for the connection based on any number of load-balancing techniques.

In an embodiment, the database system includes a broker process that manages connection request from clients. The broker process receives a request that specifies a database service and determines which database instances are running the specified service. The broker process establishes a connection between the client and a database instance that is running the specified service.

Referring again to FIG. 2, Clients 202A, 202B, and 202C are communicatively coupled to database clusters 100 and 140. Client 202A requested a connection to database service 206A. Database service 206A is only running on instance 106, so the broker process establishes a connection between client 202A and database server instance 106.

Client 202B requested a connection to database service 206B. Database service 206B is running on both database server instance 106 and 116. The broker process selects one of database server instance 106 or 116 for the connection with client 202B. In an embodiment, the broker process selects a database instance based on the number of connections already established at each node. In the present example, if a client is connected to instance 106 but no client is connected to instance 116, the broker process selects database server instance 116 and establishes a connection between client 202B and database server instance 116.

Client 202C requested a connection to database service 206D. Database service 206D is running on instance 146 and 156. Since neither instance is currently connected to a client, the broker process selects one of instance 146 and 156. In the present example, the database server establishes a connection between client 202C and instance 146.

Creating a Unit-to-Service Mapping

As work in a database system is grouped into services based on attributes of the work, work associated with a particular service may be limited to particular database objects, or portions thereof. For example, a service for generating current reports may only require data from particular table partitions. A service for generating yearly reports may require data from other table partitions. Similarly, a service related to sales reporting requires different tables than a service related to customer data. Thus, database objects do not need to be loaded into volatile memory of all nodes.

As used herein, a "unit" is a database object, or one or more portions of a database object. When a unit is mapped to one or more services, the unit is treated as "in memory" only by those nodes that are executing one of the services to which the unit has been mapped. Thus, mapping a unit to a service effectively designates which nodes will host the unit. Specifically, if a unit is mapped to a particular service, then the unit is hosted only by those nodes that are running the particular service.

In order to associate units with services, the database stores a unit-to-service mapping. The unit-to-service mapping indicates, for a database object, which nodes will host the unit. The nodes that host the unit load the unit into their volatile memory in response to a load-triggering event.

For the purpose of explanation, examples shall be given in which the unit-to-service mapping is an object-to-service mapping in which entire objects are mapped to services. However, as explained herein, the unit-to-service mapping may be made at other levels of granularity, including at the level of chunks (which may be partitions), or groups of chunks.

In an embodiment, the object-to-service mapping is stored in the database as property data associated with a database object. Property data may be specified in a database object creation or modification statement received from a database client user or application. In other embodiments, property data may be hardcoded or provided from a configuration file, which may be automatically provided by the database system.

FIG. 3 is a block diagram that depicts an example database statement for defining an object-to-service mapping, in an embodiment. FIG. 3 includes object-to-service mapping creation statement 350, object clause 352, and in-memory clause 354.

Object-to-service mapping creation statement 350 illustrates component clauses for a database statement that creates an object-to-service mapping. The database statement comprises an {OBJECT} clause and an {INMEMORY} clause.

The {OBJECT} clause creates or modifies a database object. Examples are shown in object clause 352 for creating a table, modifying a table, modifying a partition, creating a tablespace, and modifying a tablespace. An object-to-service mapping for a database object propagates hierarchically to child objects of the database object. For example, any future created tables, table partitions, indexes and other objects within a tablespace will inherit the object-to-service mapping for the tablespace. If an object-to-service mapping is specified for a child object, then the child object's object-to-service mapping over-rides the parent object's mapping.

The {INMEMORY} clause specifies whether an object may be loaded into memory and whether the object is associated with one or more services. In memory clause 354 illustrates two example in-memory clauses.

The first in-memory clause example, "NO INMEMORY" indicates that the database object should not be loaded into memory. Thus, the database object is not in-memory enabled and will be treated as not in-memory enabled by all nodes in the database system.

The second in-memory clause example, "INMEMORY {PROPERTY}" specifies that the database object is in-memory enabled and can be loaded into memory of nodes in the database system.

The {PROPERTY} clause specifies how and where the object should be loaded into memory. Property clause 356 illustrates two example in-memory properties, FOR SERVICE and PRIORITY.

As discussed in further detail below, PRIORITY specifies a priority level for the in-memory object.

FOR SERVICE specifies which database services, if any, the object should be associated with. As shown in in-memory property clause 156, the FOR SERVICE property has four values:

DEFAULT indicates that the object is distributed among nodes of the cluster using any distribution method. For example, the object is divided into distinct portions and distributed among nodes of the cluster using techniques described in the Distribution application described above.

ALL indicates that the object can be loaded into volatile memory of any node in the cluster. For example, the database object can be loaded into volatile memory of any node that receives a request that targets the database object, if the database object has not already been loaded into memory of another node.

NONE indicates that the database object cannot be populated into volatile memory of any node. That is, the database object is treated as not in-memory enabled by all nodes.

[Service Name] indicates that the database object can be loaded into volatile memory of nodes in which the named database service or services are active and running. One or more database services may be specified for an object. The database object is considered in-memory enabled only for the nodes that are running the database service. The database object is treated as not in-memory enabled by nodes that are not running the database service.

Load Triggering Events

A load-triggering event is an event that triggers the loading, into volatile memory, of a database object. Various events may trigger the loading of a memory-enabled object into volatile memory. For example, in some cases, a memory-enabled object may be loaded into volatile memory upon system start up. In other cases, loading a memory-enabled object into volatile memory may be triggered by receiving a query that targets data items from the memory-enabled object. In other cases, a database application may submit an explicit request for a particular memory-enabled database object to be loaded into volatile memory. The techniques described herein are not limited to any particular load-triggering event.

According to one embodiment, a load-triggering event includes a node determining that a database object has not already been loaded into the volatile memory of any node. Such a check may involve inspecting metadata, within the volatile memory of the node performing the check, that indicates which database objects have been loaded by any node.

Coordinator Process

In some embodiments, a database system may comprise a coordinator process. The coordinator process periodically determines, based on the object-to-service mapping and service-to-node mapping whether any database objects should be loaded into memory and whether volatile memory allocated for a database object should be deallocated.

If a copy of an object has been loaded into volatile memory of a node, but the associated service is no longer running on that node, the coordinator process detects that the particular database service has stopped on the node. The coordinator process may indicate to the node that it should deallocate the copy of the object.

In an embodiment, a database object may be associated with a priority level. The priority level may indicate that the database object should be loaded into volatile memory pro-actively, rather than when it is requested. If the priority level of an object indicates that the object should be loaded into volatile memory pro-actively, and the object is not already loaded into the volatile memory of any node, the coordinator causes the object to be loaded into volatile memory.

Referring to FIG. 3, the PRIORITY property specifies that a database object should be loaded into memory with a specified priority level, which may include LOW, MEDIUM, and HIGH. In an embodiment, the coordinator process is configured to load a database object into volatile memory proactively if the object includes a priority level. The coordinator process may database objects into volatile memory in order of their priority level.

If the database object is modified so that it does not include a priority level, and a copy of the object has been loaded into volatile memory of a node, the coordinator process may indicate to the node that it should deallocate the copy of the object.

Loading Objects into Volatile Memory

On a load-triggering event, a node determines whether to load a database object into its volatile memory. In an embodiment, a node receives an indication from a coordinator process or from another node to load a particular database object. For example, as described above, a coordinator process periodically determines whether database objects need to be loaded into volatile memory of any nodes.

Figure 4:
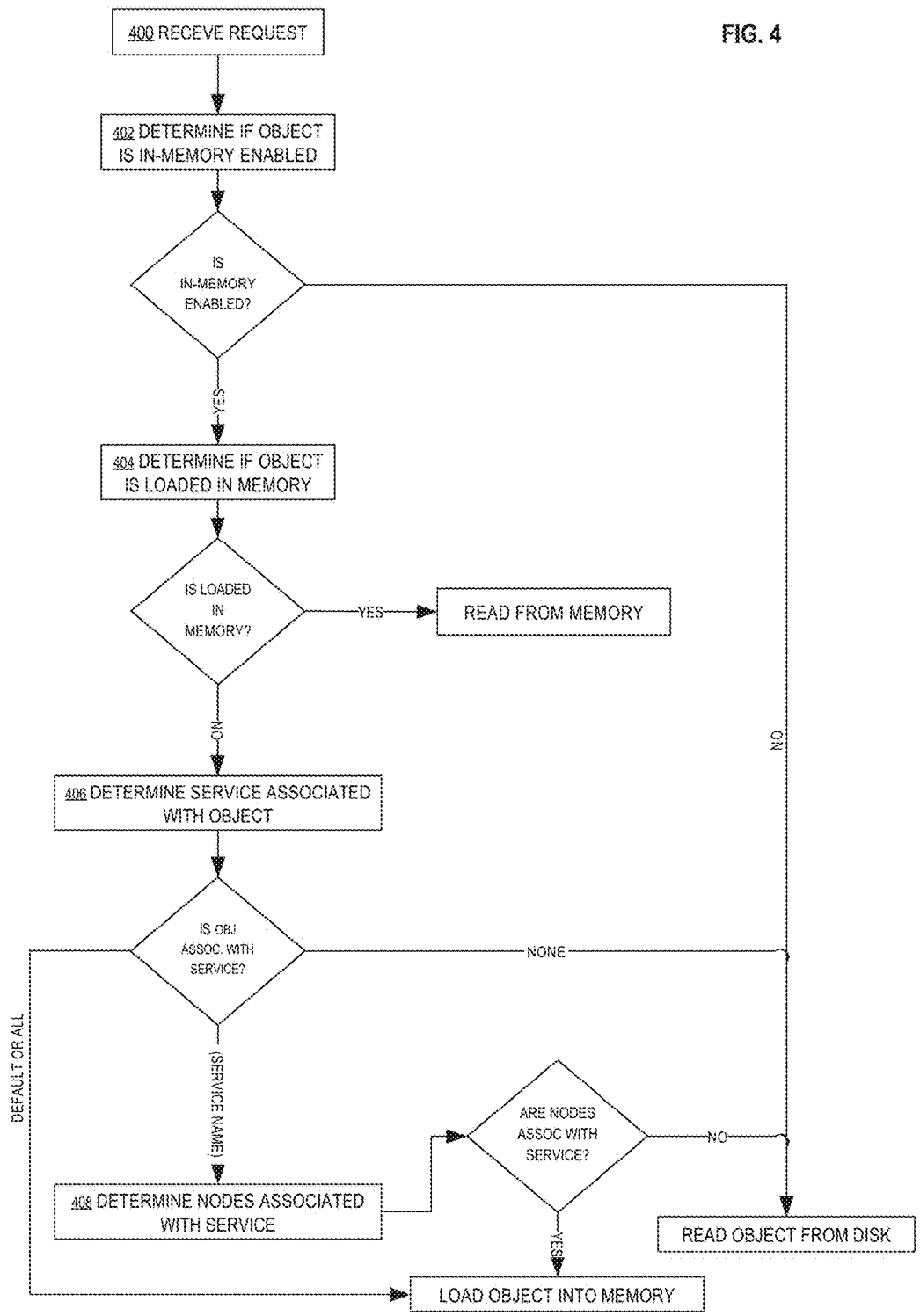
FIG. 4 is a flowchart illustrating steps for determining how to distribute a database object to nodes in a database system, in an embodiment.

A node may also receive a request that targets a database object and determines, based on the object-to-service mapping, whether to load the database object into volatile memory. Referring to FIG. 4, it is a flowchart illustrating a process for determining whether to load a database object into volatile memory, in an embodiment.

At Step 400, a database server instance receives a request that targets one or more database objects. For the purpose of illustration, assume database server instance 106 receives a query that targets table 167.

At Step 402, the database server instance determines whether the one or more database objects are in-memory enabled. If a database object is not in-memory enabled, then the database object is not loaded into volatile memory. In an embodiment, the database server instance reads the database object from disk or from a buffer, without loading the object into volatile memory or storing in a mirror format.

If the database object is in-memory enabled, then the database server instance determines whether it is loaded into volatile memory of any nodes or whether to load the object into volatile memory of one or more nodes. In the present example, database server instance 106 determines whether table 167 is in-memory enabled. For the purpose of illustration, assume table 167 is in-memory enabled.

At Step 404, the database server instance determines whether the object is already loaded into volatile memory of a node. In an embodiment, each node maintains a mapping that indicates which objects have been loaded into its respective memory.

If a copy of the object has been loaded into volatile memory of a different node, then the database server instance sends the request to that node. If a copy of the object has been loaded into volatile memory of the node running the database server instance, then the database server instance reads the copy of the object from volatile memory. If the database object has not been loaded into volatile memory of any node, then the method proceeds to step 406.

In the present example, database server instance 106 determines whether table 167 is loaded in memory of any nodes. For the purpose of illustration, assume table 167 has not been loaded in memory of any nodes.

At Step 406, the database server determines, based on the object-to-service mapping, what services, if any, are associated with the object. If the object is associated with one or more particular services, then the method proceeds to step 408.

In an embodiment, if the object is not associated with any particular service, then the object may be loaded into memory or read from a disk without loading into memory, based on the property values stored in the object-to-service mapping. For example, as described above, if the FOR SERVICE property clause for the object has a value of DEFAULT, then the object may be distributed among nodes of the cluster using any distribution method. If the value is ALL, then the object may be loaded into volatile memory of any node in the cluster. If the property is set to NONE then the object is read from disk without loading into memory.

In the present example, database server instance 106 determines, based on the object-to-service mapping, if any services are associated with table 167. For the purpose of illustration, assume database instance 106 determines that table 167 is associated with database service 206C.

At Step 408, the database server determines, based on the node-to-service mapping, which nodes are running the service. In an embodiment, if the node that received the request is running the service, it loads the object into its own volatile memory. If the node is not running the service, the node sends the request to a node that is running the service. The node that is running the service loads the database object into volatile memory and completes the request. In the present example, service 206C is associated with instance 126 on node 122 and instance 136 on node 132. Database server instance 106 selects and sends the request to instance 126. Instance 126 will load the database object into volatile memory 124. In other embodiments, if the node is not running the service, it loads the database object from disk.

In an embodiment, if more than one node is running the service, then the database object is divided into distinct portions and the portions are distributed among the volatile memories of the nodes that are running the service. For example, rather than sending the request to only instance 126, the database object may be divided between nodes 122 and 132 and distinct portions of the database object are loaded into volatile memory 124 and 134.

In an embodiment, if a particular node running the service is not part of the same database cluster as the database instance, then the object is not loaded into the volatile memory of the particular node. If other nodes in the cluster are also running the database service, then the object is distributed among the volatile memories of those nodes in the cluster. If no other node in the cluster is running the database service, then the database server instance reads the database object from disk without loading the database object into memory. For example, if instance 106 receives a request that requires a database object that is associated with database service 206D, instance 106 cannot send the request to instance 146 or 156. Instance 106 will read the database object from disk.

FIG. 5A-D illustrate example configurations of services mapped to nodes of one or more database clusters. Cluster 100 and cluster 140 are disjoint relative to each other. Assume cluster 100 is connected to a primary database and cluster 140 is connected to a replica of the primary database.

Figure 5A:
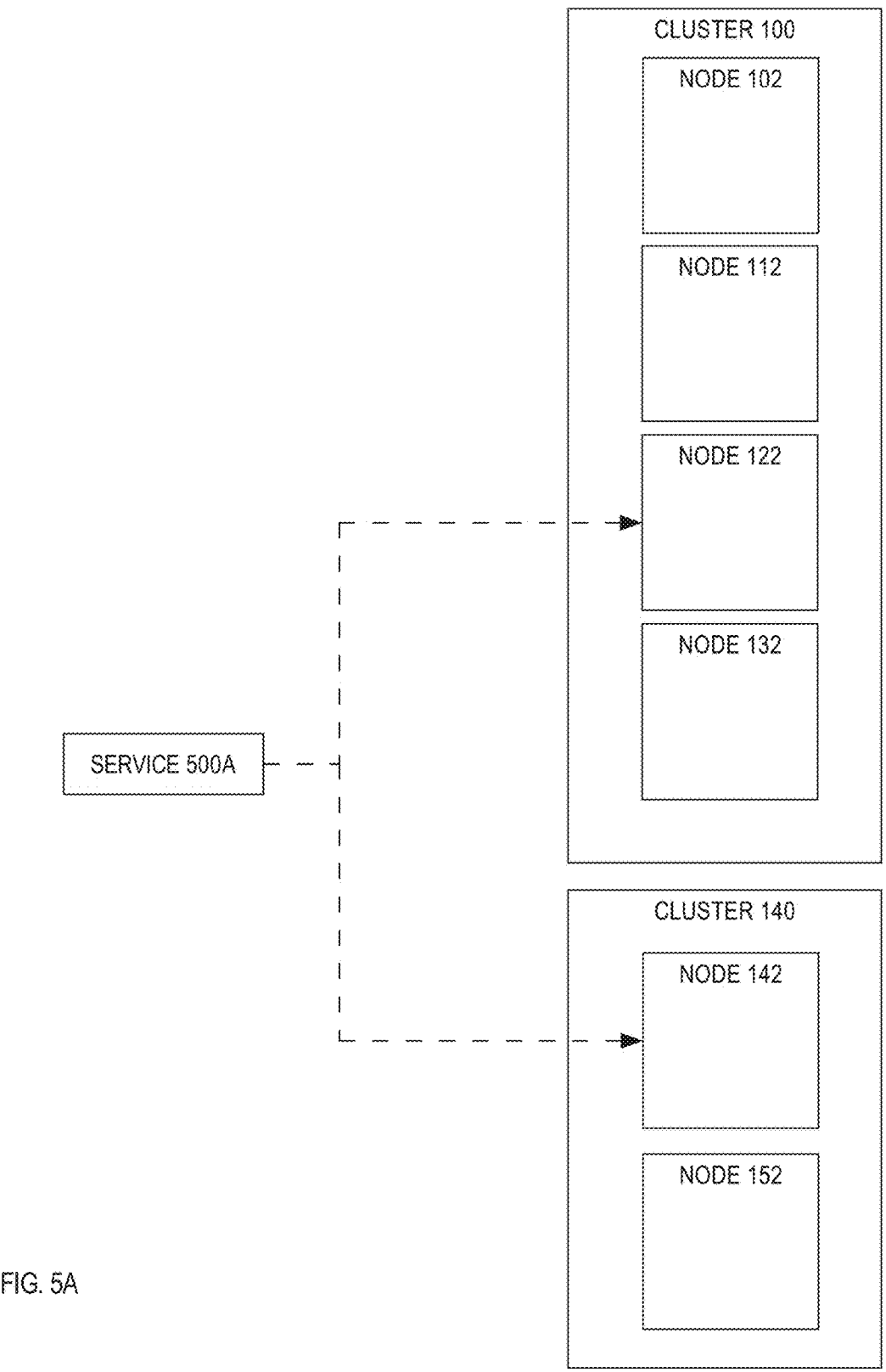
FIG. 5A-D

Referring to FIG. 5A, service 500A is mapped to node 122 in cluster 100 and node 142 in cluster 140.

Figure 5B:
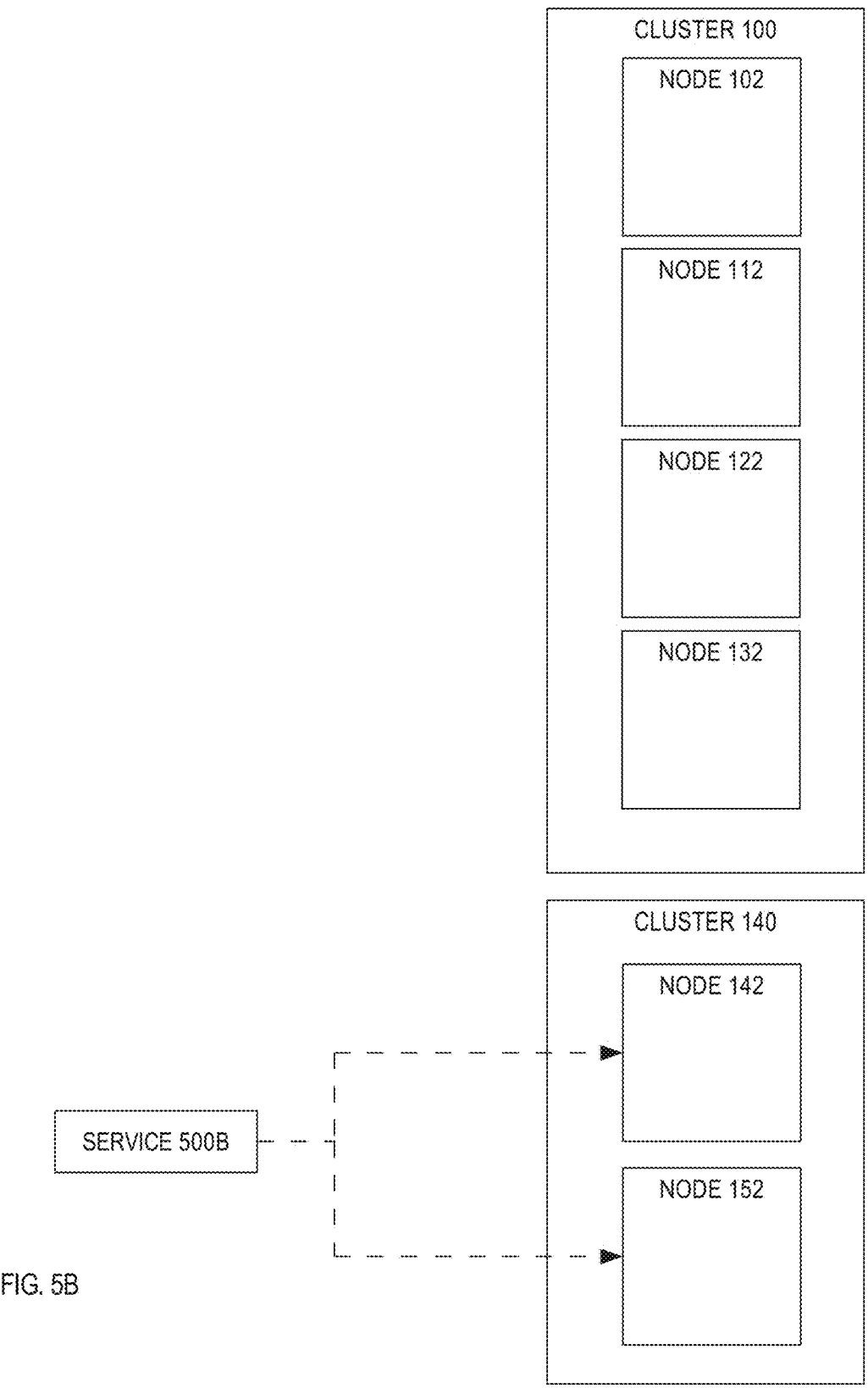

Referring to FIG. 5B, service 500B is mapped to nodes 142 and 152 in replica cluster 140.

Figure 5C:
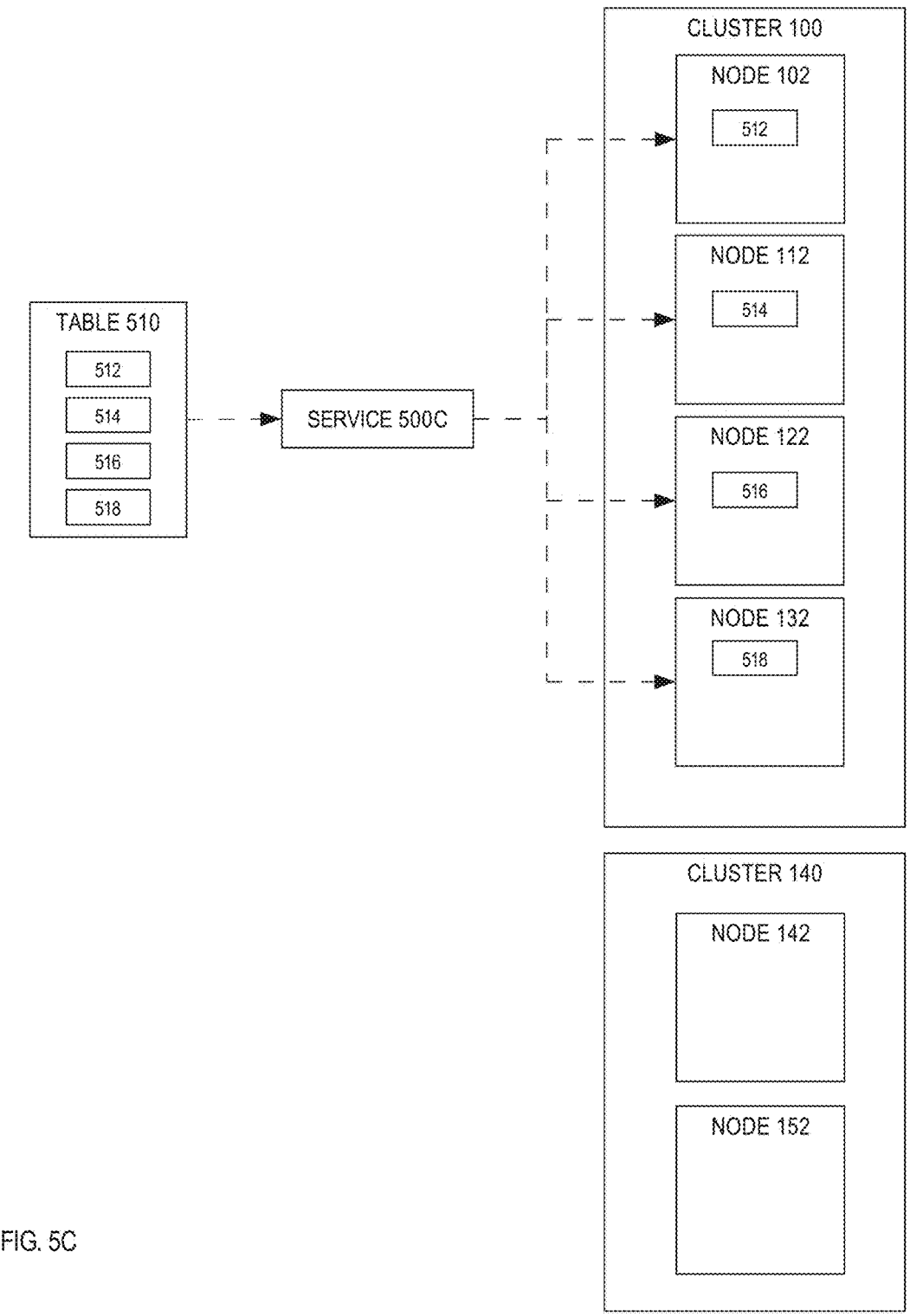

Referring to FIG. 5C, table 510 is mapped to service 500C. Service 500C is mapped to nodes 102, 112, 122, and 132 of cluster 100. Table 510 is divided into chunks 512, 514, 516, and 518. The chunks are distributed among nodes 102, 112, 122, and 132 of cluster 100. In the illustrated example, chunk 512 is loaded in memory of node 102, chunk 514 is loaded in memory of node 112, chunk 516 is loaded in memory of node 122, and chunk 518 is loaded in memory of node 132. For the purpose of illustration, table 512 is divided into four chunks. However, a table may be divided into any number of chunks of any size, and each node may host a different number of chunks.

Figure 5D:
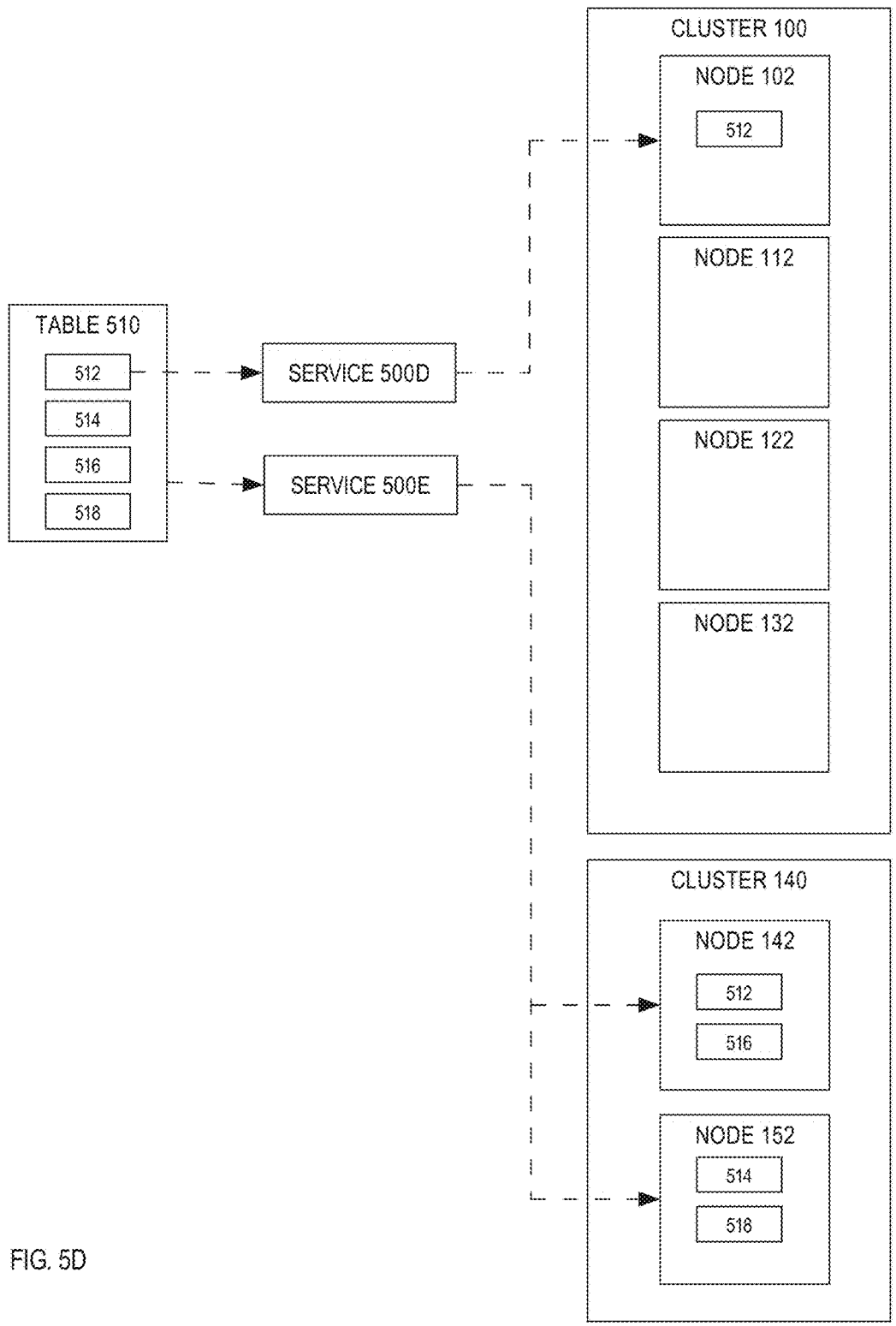

Referring to FIG. 5D, chunk 512 of table 510 is mapped to service 500D while the entirety of table 510 is mapped to service 500E. Service 500D is mapped to node 102 of cluster 100. Only chunk 512 is loaded in memory of node 102.

Service 500E is mapped to both node 142 and node 152 of cluster 140. Chunks 512, 514, 516, and 518 of table 510 are divided between nodes 142 and 152. In the present illustration, node 142 has loaded chunk 512 and 516, and node 152 has loaded chunk 514 and 518 in memory.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 6:
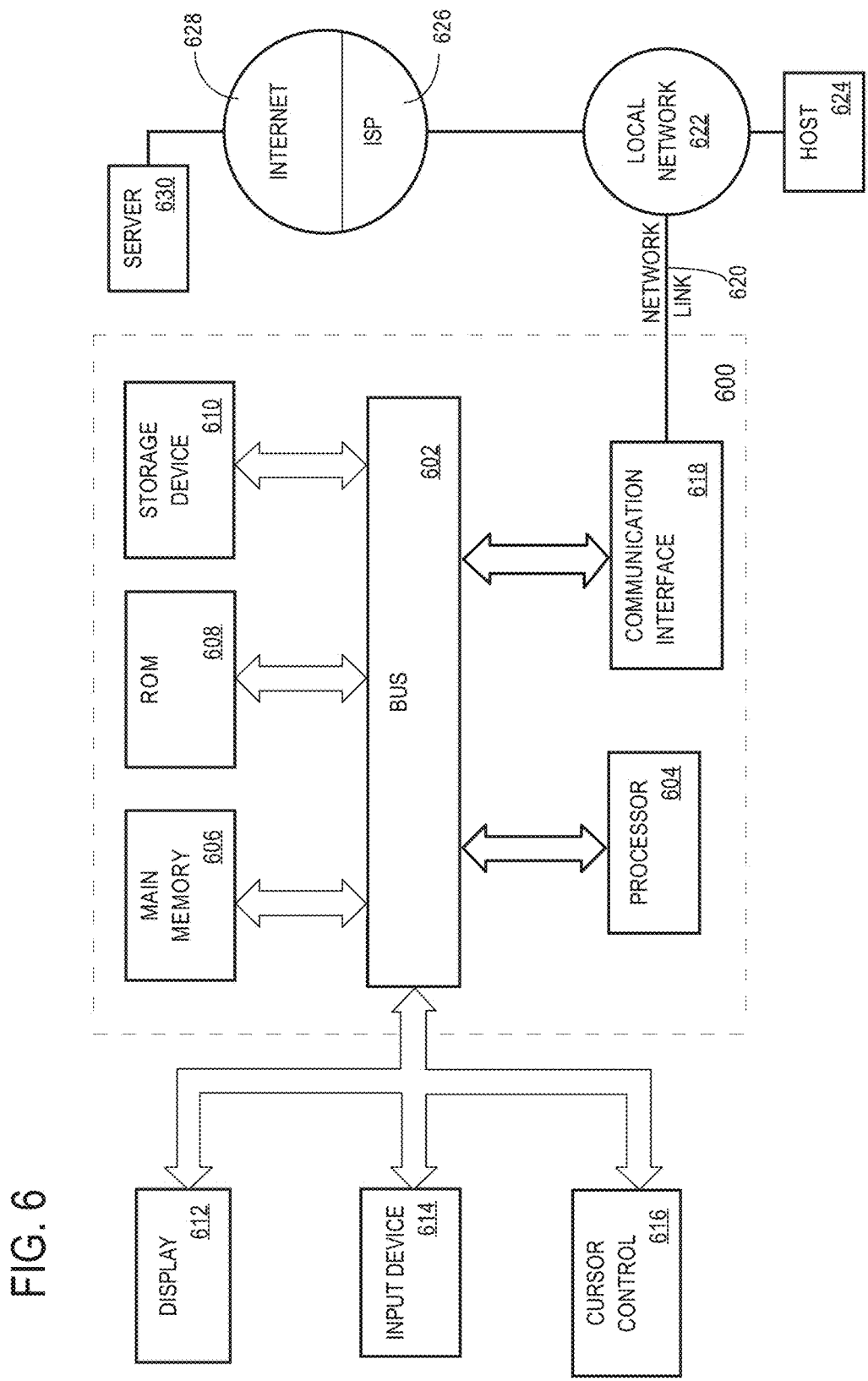
FIG. 6 is a block diagram illustrating a computer system that may be used to implement the techniques described herein.

For example, FIG. 6 is a block diagram that illustrates a computer system 600 upon which an embodiment of the invention may be implemented. Computer system 600 includes a bus 602 or other communication mechanism for communicating information, and a hardware processor 604 coupled with bus 602 for processing information. Hardware processor 604 may be, for example, a general purpose microprocessor.

Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Such instructions, when stored in non-transitory storage media accessible to processor 604, render computer system 600 into a special-purpose machine that is customized to perform the operations specified in the instructions.

Computer system 600 further includes a read only memory (ROM) 608 or other static storage device coupled to bus 602 for storing static information and instructions for processor 604. A storage device 610, such as a magnetic disk, optical disk, or solid-state drive is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

Computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 610. Volatile media includes dynamic memory, such as main memory 606. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid-state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A computer-implemented method comprising:
    storing, in a database that is accessible to a plurality of nodes, a unit-to-service mapping that maps a particular unit in the database to a particular database service, wherein the particular database service is a grouping of work executing in the database, wherein the particular unit includes one or more tables of the database;
    storing, in the database, a service-to-node mapping that maps the particular database service to one or more nodes, wherein the one or more nodes are less than all of the plurality of nodes;
    based on both the unit-to-service mapping and the service-to-node mapping, the one or more nodes treating the particular unit as in-memory enabled and nodes, of the plurality of nodes, other than the one or more nodes treating the particular unit as not in-memory enabled, wherein chunks of tables that belong to in-memory enabled units are eligible for being pre-loaded into volatile memory to speed up query processing; and
    wherein, each node of the one or more nodes treats the particular unit as in-memory enabled by loading at least a copy of a portion of the particular unit into local volatile memory in response to a load-triggering event and
    as part of the loading at least the copy of the portion of the particular unit into the local volatile memory, converting the particular unit from a persistent-format to a mirror-format, wherein the method is performed by one or more computing devices.

2. The method of claim 1 wherein the particular unit is an entire database object.

3. The method of claim 1 wherein the particular unit is one or more chunks of a database object but less than all of the database object.

4. The method of claim 1 wherein:
the particular unit is a first object in the database;
the database includes a second object;
the second object is not mapped to any service; and
the method further comprising storing data that indicates that the second object is to be treated as memory-enabled by one of:
all of the plurality of nodes, or
none of the plurality of nodes.

5. The method of claim 1 wherein the one or more nodes includes a first node that has loaded a copy of the particular unit into volatile memory, the method further comprising:
detecting that the particular database service has stopped on the first node; and
responsive to detecting that the particular database service has stopped on the first node, deallocating the copy of the particular unit from local volatile memory of the first node.

6. The method of claim 1 wherein the one or more nodes includes a first node that has loaded a copy of the particular unit into volatile memory, the method further comprising:
receiving a request at the first node that requires the particular unit;
determining that the first node has loaded a copy of the particular unit into volatile memory; and
reading the copy of the particular unit.

7. The method of claim 1 wherein the one or more nodes includes a first node that has loaded a copy of the particular unit into volatile memory, the method further comprising:
receiving a request at a second node that requires the particular unit;
determining that the first node has loaded a copy of the particular unit into volatile memory; and
sending the request to the first node.

8. The method of claim 1 further comprising:
receiving a request that requires the particular unit;
determining that no node of the one or more nodes has loaded a copy of the particular unit into volatile memory; and
in response to determining that no node has loaded a copy of the particular unit into volatile memory, at least one node of the one or more nodes loading at least a portion of the particular unit into local volatile memory.

9. The method of claim 1 wherein the plurality of nodes belong to a first database system and the one or more nodes include at least one node that belongs to a second database system that is disjoint relative to the first database system.

10. The method of claim 9 wherein the one or more nodes include a node in the first database system and a node in the second database system.

11. The method of claim 9 wherein the one or more nodes include only nodes in the second database system.

12. The method of claim 9 wherein:
the particular unit is a first object in the database;
the database includes a second object that is a portion of the first object;
the second object is mapped to one or more nodes of the first database system; and
the particular unit is mapped to one or more nodes of the second database system.

13. The method of claim 1 wherein the particular unit comprises a plurality of chunks and each node of the one or more nodes hosts one or more chunks of the plurality of chunks.

14. One or more non-transitory computer-readable media storing instructions, wherein the instructions include:
instructions which, when executed by one or more hardware processors, cause storing, in a database that is accessible to a plurality of nodes, a unit-to-service mapping that maps a particular unit in the database to a particular database service, wherein the particular database service is a grouping of work executing in the database, wherein the particular unit includes one or more tables of the database;
instructions which, when executed by one or more hardware processors, cause storing, in the database, a service-to-node mapping that maps the particular database service to one or more nodes, wherein the one or more nodes are less than all of the plurality of nodes;
instructions which, when executed by one or more hardware processors, cause based on both the unit-to-service mapping and the service-to-node mapping, the one or more nodes treating the particular unit as in-memory enabled and nodes, of the plurality of nodes, other than the one or more nodes treating the particular unit as not in-memory enabled, wherein chunks of tables that belong to in-memory enabled units are eligible for being pre-loaded into volatile memory to speed up query processing; and
wherein, each node of the one or more nodes treats the particular unit as in-memory enabled by loading at least a copy of a portion of the particular unit into local volatile memory in response to a load-triggering event; and
instructions which, when executed by one or more hardware processors, cause as part of the loading at least the copy of the portion of the particular unit into the local volatile memory, converting the particular unit from a persistent-format to a mirror-format.

15. The one or more non-transitory computer-readable media of claim 14, wherein the particular unit is an entire database object.

16. The one or more non-transitory computer-readable media of claim 14, wherein the particular unit is one or more chunks of a database object but less than all of the database object.

17. The one or more non-transitory computer-readable media of claim 14 wherein:
the particular unit is a first object in the database;
the database includes a second object;
the second object is not mapped to any service; and
the instructions further including instructions which, when executed by one or more hardware processors, cause storing data that indicates that the second object is to be treated as memory-enabled by one of:
all of the plurality of nodes, or
none of the plurality of nodes.

18. The one or more non-transitory computer-readable media of claim 14 wherein the one or more nodes includes a first node that has loaded a copy of the particular unit into volatile memory, the instructions further comprising:
instructions which, when executed by one or more hardware processors, cause detecting that the particular database service has stopped on the first node; and
instructions which, when executed by one or more hardware processors, cause responsive to detecting that the particular database service has stopped on the first node, deallocating the copy of the particular unit from local volatile memory of the first node.

19. The one or more non-transitory computer-readable media of claim 14 wherein the one or more nodes includes a first node that has loaded a copy of the particular unit into volatile memory, the instructions further comprising:

instructions which, when executed by one or more hardware processors, cause receiving a request at the first node that requires the particular unit;

instructions which, when executed by one or more hardware processors, cause determining that the first node has loaded a copy of the particular unit into volatile memory; and instructions which, when executed by one or more hardware processors, cause reading the copy of the particular unit.

20. The one or more non-transitory computer-readable media of claim 14 wherein the one or more nodes includes a first node that has loaded a copy of the particular unit into volatile memory, the instructions further comprising:

instructions which, when executed by one or more hardware processors, cause receiving a request at a second node that requires the particular unit;

instructions which, when executed by one or more hardware processors, cause determining that the first node has loaded a copy of the particular unit into volatile memory; and instructions which, when executed by one or more hardware processors, cause sending the request to the first node.

21. The one or more non-transitory computer-readable media of claim 14, the instructions further comprising:

instructions which, when executed by one or more hardware processors, cause receiving a request that requires the particular unit;

instructions which, when executed by one or more hardware processors, cause determining that no node of the one or more nodes has loaded a copy of the particular unit into volatile memory; and instructions which, when executed by one or more hardware processors, cause in response to determining that no node has loaded a copy of the particular unit into volatile memory, at least one node of the one or more nodes loading at least a portion of the particular unit into local volatile memory.

22. The one or more non-transitory computer-readable media of claim 14 wherein the plurality of nodes belong to a first database system and the one or more nodes include at least one node that belongs to a second database system that is disjoint relative to the first database system.

23. The one or more non-transitory computer-readable media of claim 22 wherein the one or more nodes include a node in the first database system and a node in the second database system.

24. The one or more non-transitory computer-readable media of claim 22 wherein the one or more nodes include only nodes in the second database system.

25. The one or more non-transitory computer-readable media of claim 22 wherein:

the particular unit is a first object in the database;

the database includes a second object that is a portion of the first object;

the second object is mapped to one or more nodes of the first database system; and the particular unit is mapped to one or more nodes of the second database system.

26. The one or more non-transitory computer-readable media of claim 22 wherein the particular unit comprises a plurality of chunks and each node of the one or more nodes hosts one or more chunks of the plurality of chunks.

* * * * *

UNITED STATES PATENT AND TRADEMARK OFFICE
CERTIFICATE OF CORRECTION

PATENT NO. : 10,474,653 B2
APPLICATION NO. : 15/281718
DATED : November 12, 2019
INVENTOR(S) : Mukherjee et al.

It is certified that error appears in the above-identified patent and that said Letters Patent is hereby corrected as shown below:

On the Title Page

On page 3, Column 2, under Other Publications, Line 56, delete "E-Commercce" and insert
-- E-Commerce --, therefor.

In the Drawings

On sheet 4 of 9, in FIG. 4, under Reference Numeral 400, Line 1, delete "RECEVE" and insert
-- RECEIVE --, therefor.

In the Specification

In Column 3, Line 53, delete "FIG. 5A-D" and insert -- FIGS 5A-D illustrate example configurations of services mapped to nodes of one or more database clusters in an embodiment. --, therefor.

In the Claims

In Column 14, Line 46, in Claim 1, delete "ail" and insert -- all --, therefor.

Signed and Sealed this
Ninth Day of February, 2021

Drew Hirshfeld
*Performing the Functions and Duties of the*
*Under Secretary of Commerce for Intellectual Property and*
*Director of the United States Patent and Trademark Office*